Dec. 14, 1954   W. C. OBEREM   2,696,769
CONTROL SYSTEM FOR BOX BLANK FORMING MACHINES
Filed Nov. 20, 1951   5 Sheets-Sheet 1

Inventor
William C. Oberem
by Roberts, Cushman & Grover
att'ys.

United States Patent Office 2,696,769
Patented Dec. 14, 1954

2,696,769

CONTROL SYSTEM FOR BOX BLANK FORMING MACHINES

William C. Oberem, New Hartford, Conn., assignor to Colt's Manufacturing Company, Hartford, Conn., a corporation of Connecticut Application November 20, 1951, Serial No. 257,304

16 Claims. (Cl. 93—58)

This invention relates to electrical control systems and more particularly to a control system for use with a machine for performing successive operations upon a sheet of material such as the Machine for Making Box Blanks described and illustrated in the copending patent application of Alexander V. Hose, Serial No. 306,279 filed August 25, 1952, which application is a continuation of a prior application, Serial No. 89,961, filed April 27, 1949, now abandoned.

Objects of this invention are to provide a control system which controls the progress of a sheet of material along the pathway of a machine performing successive operations thereupon, which coordinates and synchronizes the successive operations with the movements of the sheet material, which is readily adjustable so that the machine will selectively form blanks for liners, taped joint boxes, stitch flap boxes, overlap cartons of selected length, width and depth, which requires a minimum of standard electrical circuit components, which is trouble free and requires a minimum of maintenance and which advances the art generally.

A control system according to the invention comprises control means such as an electrically operated valve for starting and stopping the feeding means which move the sheet material along a pathway through the associated machine. The valve solenoid or other control means is energized through a pair of time closing contacts of a time delay relay and a control switch positioned in the path of the sheet material so that the switch is tripped by the leading edge of the material. A pair of normally open contacts of the time delay relay are connected in parallel with the time opening contacts so that the control means is energized to operate the feeding means except for a period from the deenergization of the time delay relay until the tripping of an interlocking switch operated by the instrumentalities which perform the successive operations. The time delay relay is energized through any one of a plurality of parallel circuits through respective pairs of switches which are arranged in spaced relationship in the path of locations behind the control switch. Each pair of switches includes a normally open switch and a normally closed switch whose respective contacts are connected in series with the operating coil of the time delay relay. The switches in each pair are arranged in spaced relationship so that the switch having normally open contacts is operated first by the movement of the sheet material to energize the time delay relay and the switch having normally closed contacts is operated subsequently to deenergize the relay. Separate control means, such as other electrically operated valves, are provided for controlling the instrumentalities operating upon the sheet material, the control means being energized through a pair of time opening contacts of the time delay relay, which contacts are connected in series with the solenoid or other operating element of the control means so that the instrumentalities are operated during the period when the movement of the sheet material is arrested. If instrumentalities performing different types of operation, for example, slotting, cutting off and printing are required, the separate control means for each instrumentality are energized through the time opening and normally closed contacts of the respective time delay relays. The time closing contacts and the normally open contacts of each relay are connected in series with the corresponding contacts of the other relays so that the feeding means is stopped for a predetermined period upon the deenergization of any one of the relays.

These and other objects and aspects of the invention will be apparent from the following detailed description of a specific embodiment of the invention referring to drawings wherein.

Figure 1:
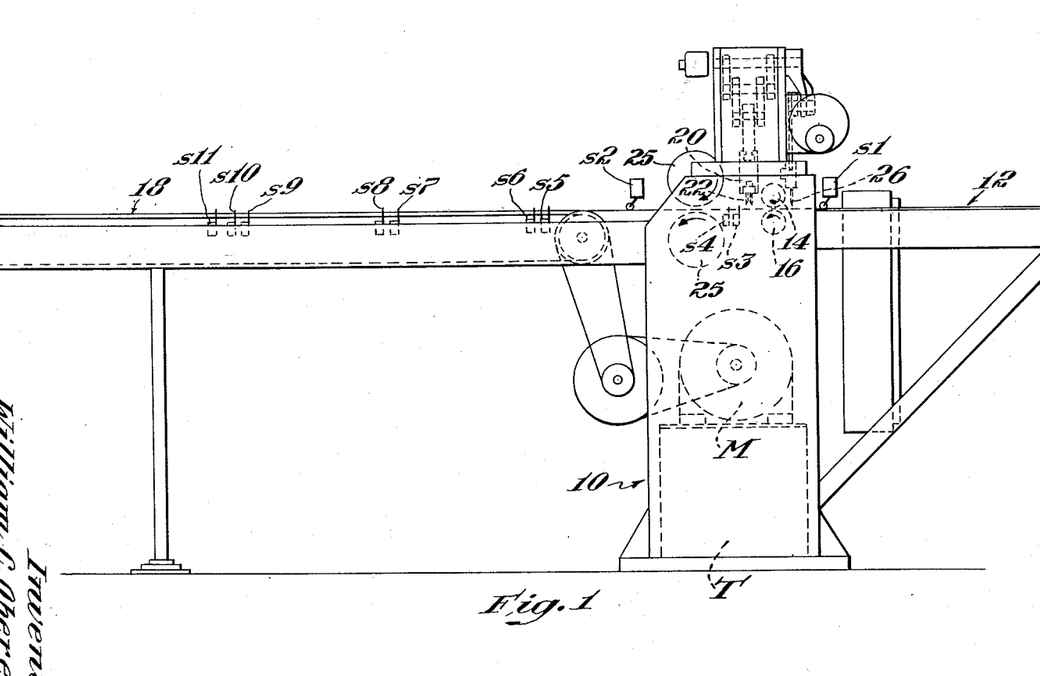
Fig. 1 is a partly schematic side elevation view of a box blank making machine showing the mounting positions of the various control switches.
Figure 2:
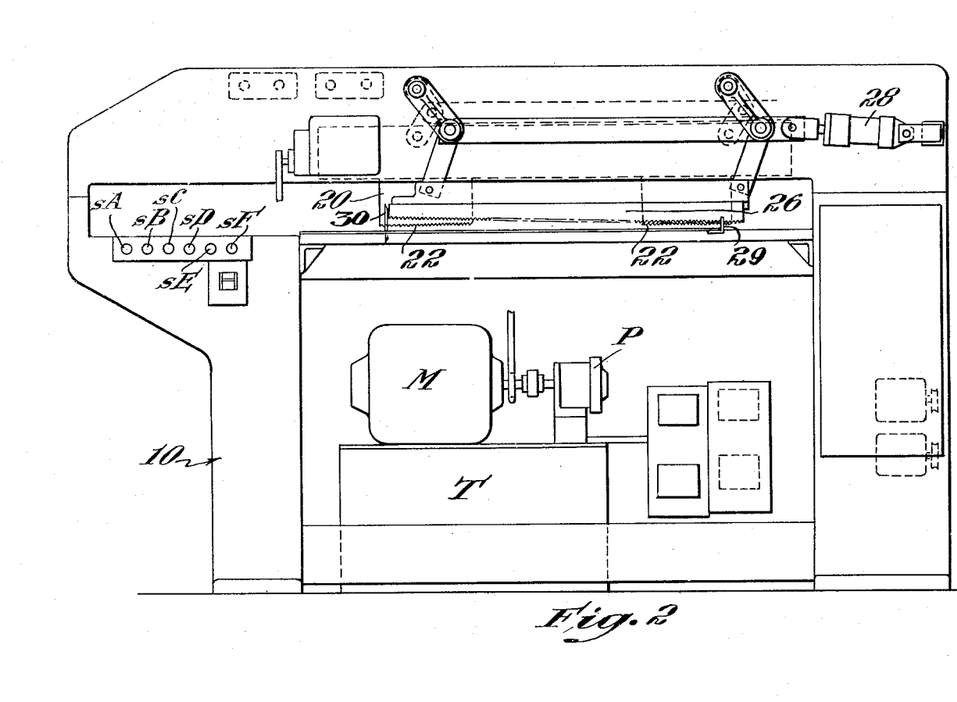
Fig. 2 is a front end view of the machine illustrated in Fig. 1.

The box blank machine shown in Figs. 1 and 2 is generally similar to that described in detail in the above-mentioned patent application of Alexander V. Hose and comprises a frame 10 supporting a table 12 forming a path along which sheet material is moved from right to left, as viewed in Fig. 1, by feeding means such as the upper and lower feed rolls 14 and 16. A hydraulic pump P driven by an electric motor M supplies oil under pressure to a hydraulic motor H (Fig. 3) through a hydraulic system which will be described in detail hereinafter. The hydraulic motor H in turn drives the feed rolls 14 and 16 by means of a conventional chain drive (not shown). After leaving the feed rolls 14 and 16 the movement of the sheet material along the table 12 is accomplished by means of a V belt 18 driven from the shaft of the motor M.

Figure 5:
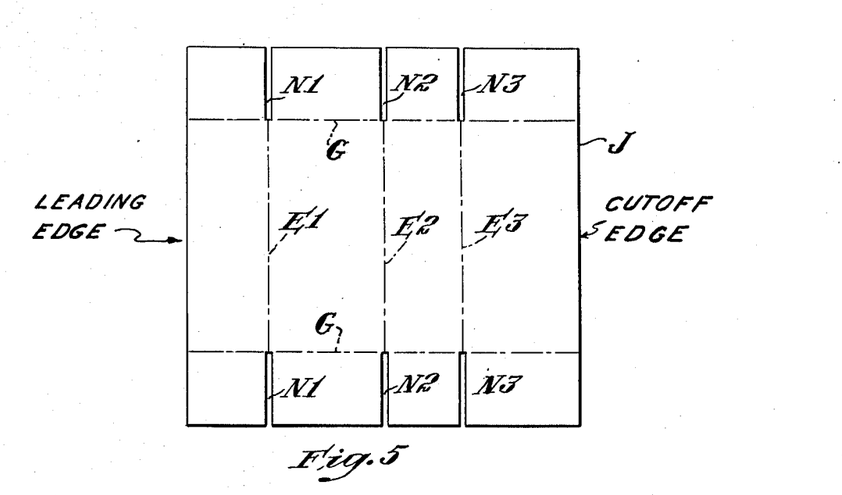
Fig. 5 is a view of a regular slotted box blank made by the machine.
Figure 6:
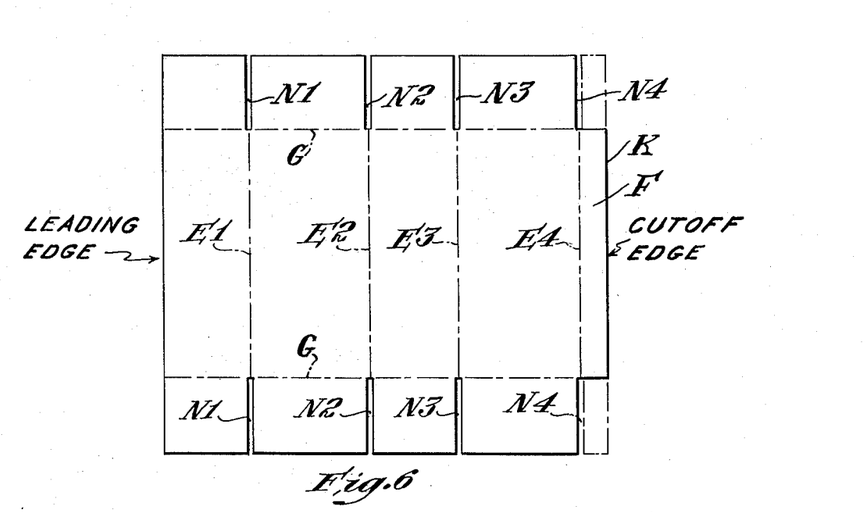
Fig. 6 is a view of a stitched flap box blank made by the machine.

A vertically movable scoring bar 20 is provided which extends transversely of the path of movement of the sheet material, the said bar being movable by means of one or more hydraulic cylinders 24, as described in detail in the above-mentioned application. The said scoring bar 20 carries two transversely spaced slotting devices 22. When moved downwardly, the said slotting devices and scoring bar serve to cut two opposed slots N extending inwardly from the edges of the sheet material and to form an interconnecting score line E, shown in Figs. 5 and 6. The machine also includes opposed scoring rolls 25 as shown and described in the above-mentioned application. The said scoring rolls form longitudinal score lines G on the sheet as shown in Figs. 5 and 6, the said score lines G being in register with the inner ends of the slots N. The scoring rolls are operatively connected for rotation in unison with the feed rolls and they have the same peripheral speed as the feed rolls. The machine is also provided with a vertically movable serrated cut-off knife 26 which is operated by means of a hydraulic cylinder 28 similar to the cylinders 24, the said knife cutting the blank along the line J at the trailing edge. As shown in Fig. 2, the machine is also preferably provided with a longitudinally extending transversely adjustable guide 29 for engaging one edge of the sheet material and with a trimming device or saw 30 oppositely disposed with respect to the guide 29, the said edge guide and the said saw being described in detail in the said prior application.

The progress of the sheet material through the machine is controlled by means of a plurality of switches $s1$—$s11$ (Figs. 1 and 4) which are arranged in longitudinally spaced relationship with their actuators projecting into the path of movement of the sheet material so that the switches are successively tripped by the leading edge of the said sheet as it progresses through the machine. Although the switches illustrated are mechanically tripped, it is to be understood that it is within the scope of this invention to provide switching means which operate due to the interruption of a light beam, the change in capacitance due to the progress of the sheet material, or by any of the other means known to one skilled in the art.

As hereinafter described in detail, the said switches $s1$ and $s11$ are connected between two terminals $a$ and $c$ of an alternating current power source (not shown). They are connected with the terminal $a$ through a main switch $sA$ which is normally in the position shown in Fig. 4. The main switch $sA$ has a second pole for energizing the circuits for the motors (not shown) which conjointly adjust the positions of the slotting devices 22, the associated scoring rolls 25 and the edge guide 29. The mechanism operated by these motors is described in detail in the above-mentioned application. The circuits for the said motors are conventional and form no part of this invention and it is only necessary to point out that the main switch $sA$ acts as an electrical interlock so that the adjusting motor circuits cannot be energized at the same time as the control system.

The normally open switch $s1$ is positioned in front of the knife cut-off 26 to start the hydraulic motor H, as described below, thus operating the feed rolls 14 and 16 when the switch is closed by the leading edge of the sheet material as the material is manually inserted in the machine. The switch $s2$ is positioned behind the scoring bar 20 and is connected in parallel with the switch $s1$ to maintain a circuit which results in the continuing operation of the feed rolls after the trailing edge of the sheet material passes beyond the location of switch $s1$. As is shown in Fig. 4, the closing of the contacts of the switch $s1$ (or switch $s2$) completes a circuit energizing the operating solenoid of an unloading valve V1 from the said terminals $a$ and $c$ to increase the pressure in the hydraulic system. The closing of the switch $s1$ (or $s2$) also completes a circuit energizing the solenoid of a stop valve V2, which circuit includes the power source terminal $a$, one pole of the main switch $sA$, the switch $s1$ (or $s2$), the time closing contacts $s12$ and $s13$ of two time delay relays R1 and R2, whose function will appear hereinafter, two interlocking switches $s14$ and $s15$ which are mechanically interlocked respectively with the toggles operating the scoring bar 20 and the cut-off knife 26 so that the switches are closed only when these instrumentalities are in inoperative positions, the solenoid of the valve V2 and the power source terminal $c$. The energization of the valve solenoid opens the stop valve V2 so that hydraulic fluid flows from the storage tank T (Fig. 3), through the pump P, the unloading valve V1, a conduit $c1$, the hydraulic motor H, a return conduit $c2$, the stop valve V2, a conduit $c3$, a slow-down valve V3 the function of which will be described in detail hereinafter, a conduit $c4$ to a drain conduit $c5$ which returns to the tank T. The stop valve V2 is inserted in the return line rather than the feed line of the hydraulic motor H so that the closing of the valve by the deenergization of its solenoid builds up a back pressure which immediately stops the motor and the connected feed rolls 14 and 16 with practically no overtravel.

As the sheet material is moved through the machine by the feed rolls 14 and 16, as described above, the leading edge thereof contacts the actuator for the normally open switch $s3$ to complete a circuit for energizing the coil of the time delay relay R1, which circuit includes the terminal $a$, a normally closed manually operated disconnect switch $sB$ preferably located as shown in Fig. 2, the said switch $s3$, the associated normally closed switch $s4$ and the relay coil to the terminal $c$. Upon energization of the coil of the relay R1, the relay contacts, which include in addition to the time-closing contacts $s12$, a pair of time-opening contacts $s16$, a pair of normally open contacts $s17$, and a pair of normally closed contacts $s18$, are all conjointly transferred from the positions shown in Fig. 4. The operation of the time-closing contacts $s12$ and the normally open contacts $s17$ is made overlapping so that, upon energizing of the relay R1, a circuit is completed through the parallel connected contacts $s17$ before the contacts $s12$ close, thus maintaining the stop valve V2 in an open position and not interrupting the operation of the feed rolls. However, upon de-energizing of the relay R1 the contacts $s17$ open immediately and the contacts $s12$ close only after a predetermined period as hereinafter explained. The operation of the time-opening contacts $s16$ and the normally closed contacts $s18$ is such that they do not overlap upon energization of the relay R1, the contacts $s18$ being opened before the contacts $s16$ are closed. However, upon de-energizing the contacts $s18$ close immediately and the contacts $s16$ open only after the said predetermined period.

The closing of the time-opening contacts $s16$, by the energizing of the relay R1, energizes the coil of a slow-down relay R3 whose contacts $s19$ close to complete a circuit energizing the solenoid of a slow-down valve V3. As can best be seen in Fig. 3, the operation of the valve V3 directs the flow of the discharge from the hydraulic motor H through a restricting orifice such as the manually adjustable valve V so that the back pressure upon the motor H is increased to slow down the speed of the motor and connected feed rolls 14 and 16.

The sheet material thereupon progresses at a greatly reduced velocity until the leading edge thereof trips the actuator of the normally closed switch $s4$ to interrupt the circuit energizing the relay R1. The relay contacts $s17$ immediately open, but the closing of the contacts $s12$ is delayed for a predetermined period, for example, by a conventional pneumatic dashpot (not shown). By reason of the immediate opening of the contacts $s17$ the circuit energizing the solenoid of the stop valve V2 is interrupted, thus closing the valve to stop the feed rolls. Upon de-energizing of the relay R1, the contacts $s18$ immediately close but the contacts $s16$ open only after the said predetermined period. As the result of the closing of the contacts $s18$ and $s16$ a circuit is completed to energize the solenoid of a valve V4 controlling the flow of hydraulic fluid to the cylinder 24 (Fig. 3) operating the scoring bar 20 and the slotting devices 22 carried thereby. The energization of the solenoid of the valve V4 transfers the valve so that hydraulic fluid under pressure is applied to the right side of the piston in the cylinder 24 through the conduits $c1$ and $c6$, the valve V4 and a conduit $c7$. The valve concomitantly connects the left side of the piston to the drain $c5$ through the conduits $c8$ and $c9$ so that the piston operates the slotting and scoring mechanism, for example, through a toggle arrangement or by means of the linkage similar to that shown in the above-mentioned copending application. The above-described operation causes the slotting devices 22 to cut two opposed slots N1 and causes the scoring bar 20 to impress a connecting score line E1 in the sheet material, as is shown in Fig. 5. The described operation of the scoring bar and of the slotting devices opens the contacts $s14$. This prevents any possible energizing of the solenoid of the stop valve V2 and therefore prevents any starting of the motor H for the feed rolls while the slotting and scoring devices are in engagement with the sheet. The stop valve solenoid is energized to start the motor H when the scoring bar and the slotting devices reach their upper positions.

Figure 3:
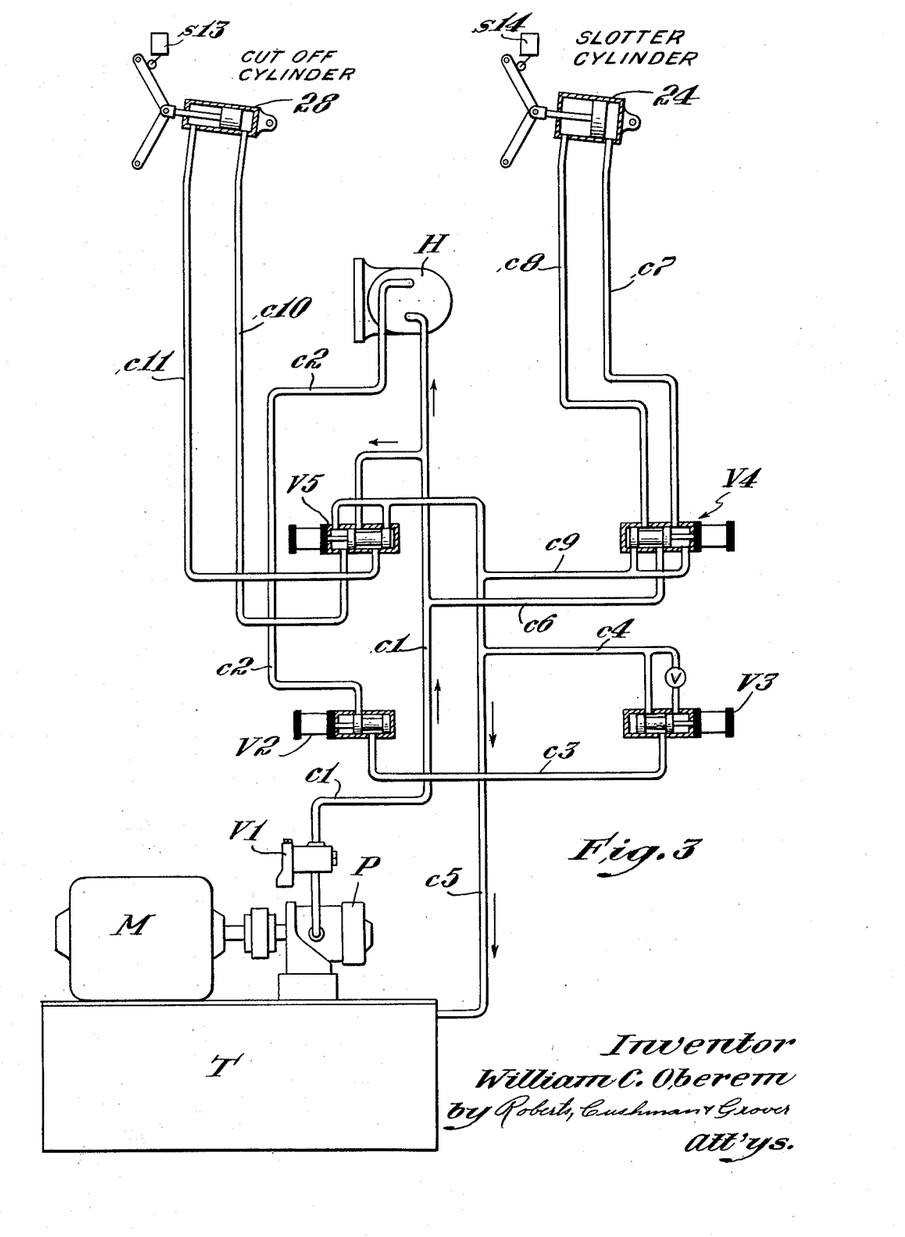
Fig. 3 is a schematic diagram of the hydraulic system of the machine.
Figure 4:
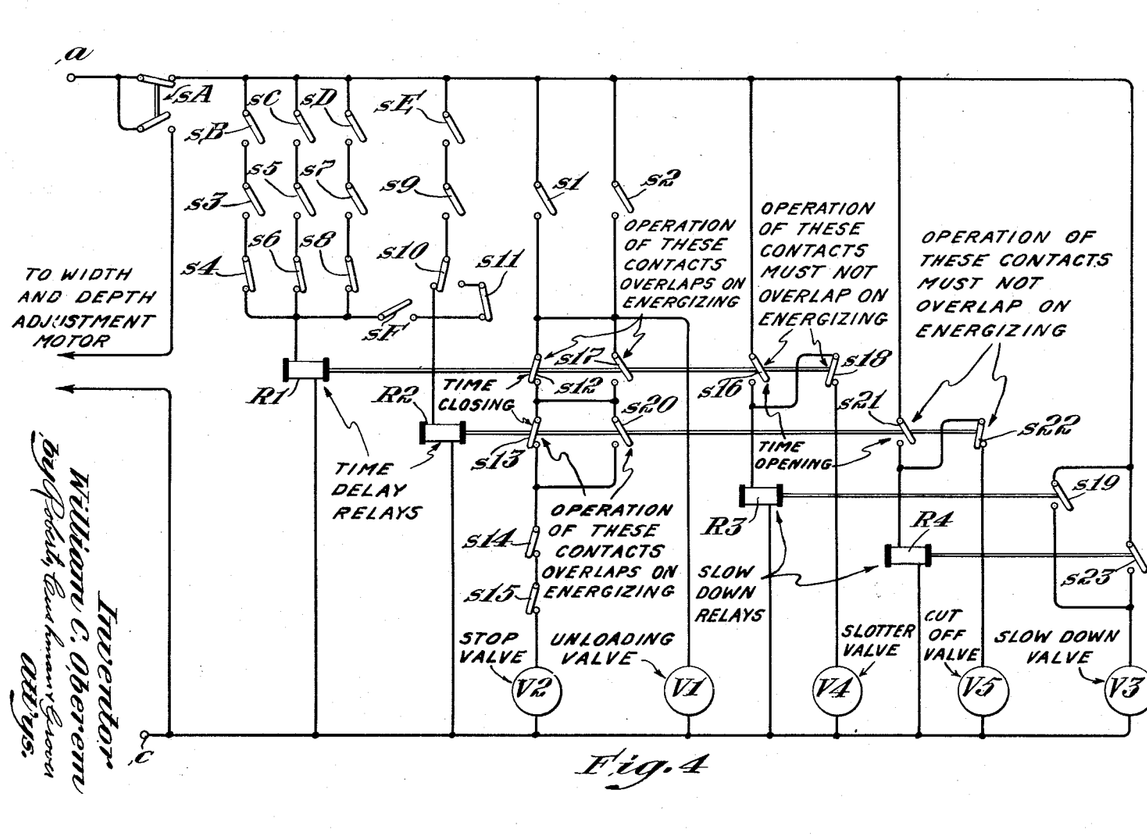
Fig. 4 is a schematic electrical diagram of the machine.

The opening of the contacts $s16$ at the end of the said predetermined period also deenergizes the slow-down relay R3 to open the contacts $s19$ and to thus return the slow-down valve V3 to its high speed position, as shown in Fig. 3. This is preparatory to the subsequent energization of the solenoid of the stop valve V2 for resumed operation of the motor H.

The opening of the contacts $s16$ at the end of the said predetermined period also serves to interrupt the circuit for the solenoid of the valve V4, thus restoring the valve to the position shown in Fig. 3. Hydraulic fluid under pressure is then supplied to the left side of the piston in the cylinder 24 through the conduits $c1$ and $c6$, the valve V4 and the conduit $c8$. At the said time the right side of the piston is connected to the drain $c5$ through the conduits $c7$ and $c9$. This causes the reverse operation of the toggle arrangement so that the scoring bar 20 and the slotting devices 22 are raised to their inoperative positions as shown in Fig. 1. Upon the closing of the contacts $s12$ after the said predetermined period the circuit for the solenoid of the stop valve V2 is partly completed. The contacts $s14$ remain open until the scoring bar and the slotting devices reach their said inoperative positions, and they are then closed to complete the circuit for the said solenoid so that operation of the motor H is resumed to resume the operation of the feed rolls.

Connected in parallel with the switches $sB$, $s3$ and $s4$ are a normally closed manually operated disconnect switch $sC$ and the before-mentioned switches $s5$ and $s6$. The said switch $sC$ is preferably located as shown in Fig. 2. As the sheet material is advanced after the forming of the slots N1 and the score line E1, the leading end thereof trips the switches $s5$ and $s6$ and there is a repetition of the operations as previously described, the sheet material being formed with the slots N2 and the score line E2.

Also connected in parallel with the switches $sB$, $s3$ and $s4$ are a normally closed manually operated disconnect switch $sD$ and the before-mentioned switches $s7$ and $s8$. The said switch $sD$ is preferably located as shown in Fig. 2. As the sheet is advanced after the forming of the slots N2 and the score line E2, the leading edge thereof trips the switches $s7$ and $s8$ and there is another repetition of the operations as previously described, the sheet being formed with the slots N3 and the score line E3.

The switches s9 and s10 are similar respectively to the control switches s3 to s8, mentioned above, and they are connected in series with a normally closed manually operated disconnect switch sE. The switch sE is preferably located as shown in Fig. 2. The said switches sE, s9 and s10 are connected in series to energize the solenoid of a second time delay relay R2. The relay R2 is similar to the relay R1, described above, and it has contacts s13, s20, s21 and s22 operable respectively in the same manner as the contacts s12, s17, s16 and s18. The time closing contacts s13 and the normally open contacts s20 are connected in an analogous manner to control the operation of the stop valve V2. The time opening contacts s21 of the relay R2 are connected to energize a second slow-down relay R4 whose contacts s23 are connected in parallel with the contacts s19 of the slow-down relay R3 so that closing of the time opening contacts s21, upon the energization of the relay R2 by the switch s9, results in the slowing down of the feed rolls 14 and 16 by the operation of the valve V3, as has been described in detail heretofore. The subsequent deenergization of the relay R2 by the tripping of the switch s10 completes an energizing circuit for a cut-off valve V5 through the contacts s21 and s22.

The valve V5, which is similar to the valve V4, controls the flow of oil through conduits c10 and c11 to the opposite sides of the piston of the cylinder 28 in an analogous manner so that energization of the valve V5 causes the cut-off knife 26 to sever the box blank from the remainder of the piece of sheet material. Upon the transfer of the time opening contacts s21 at the end of the timing period of the relay R2, the cut-off knife 26 returns to its retracted position whereupon the interlocking switch s15 closes to complete the circuit which energizes the valve V2 to re-start the feed rolls 14 and 16.

After cut-off the sheet continues to be fed by the rolls 14 and 16 and after it disengages the rolls it is moved by scoring rolls 25 and by the belt 18. When the sheet has moved sufficiently to permit the switch s2 to open, the feed rolls are stopped, unless the switch s1 is being held closed by another sheet or by the unsevered portion of the same sheet.

It will be understood that the spacing of the slots N1 and the score line E1 from the leading edge of the sheet, the spacings between the several slots and score lines and the spacing of the cut-off line J from the slots N3 and the score line E3 are determined by the longitudinal distances between the actuators for the several switches as shown in Fig. 1. These distances are adjustable, as set forth in the beforementioned application, to vary the length and width dimensions of the several portions of the box blank to be formed.

During normal operation of the machine as described, the main switch sA is in the position shown in Fig. 4, and the disconnect switches sB, sC, sD and sE are all closed. By opening any one of the switches sB, sC or sD the corresponding operation of the slotting and scoring means may be omitted, or by opening the switch sE the operation of the cut-off knife may be omitted.

The machine as thus far described is adapted for forming a box blank as shown in Fig. 5. The machine is preferably also adapted for forming a stitch flap box blank as shown in Fig. 6, such a blank having a flap F at the trailing end.

To this end the longitudinal distance setting between the switches s8 and s10, as shown in Fig. 1, is made equal to the length of the last panel of the required blank plus the width of the flap F so that the knife 26 cuts the blank along the line K at the trailing edge of the flap. Except for the different position of the cut-off line K the operations are as previously described.

In order to form the said flap F it is necessary to cut additional slots N4 and to form an additional score line E4. The longitudinal spacing of the cut-off knife 26 toward the front from the scoring bar and slotting devices is greater than the width of the flap F and it is therefore impossible to form the required slots N4 and the required score line E4 prior to cut-off. Provision is therefore made for forming the last said slots and score line after cut-off.

The switch s10 is provided with a pair of normally open contacts which are closed when the switch is tripped by the leading edge of the sheet material to operate the cut-off knife 26, as described above. The last said contacts are connected in series with the switch s11 and with a manually operated disconnect switch sF which is closed when the blank is to be formed with the flap F. The switch sF is preferably located as shown in Fig. 2. The said switch sF serves when closed to connect the switch s11 in series with the relay R1. The normally open contacts of switch s10 are held closed by the sheet material, thus completing a circuit energizing the time delay relay R1 for a fourth time, which circuit includes the terminal a, switches sA, sE, s9, s10, s11, sF and the relay coil to the terminal c. The normal opening of the switch s10 acts, as previously described, through the relay R2 to de-energize the relay R4 and thus release the slow-down valve V3. However, the normal opening of the switch s10 is immediately followed by the closing of the circuit through the switches s11 and sF, the said circuit acting through the relay R1 to energize the relay R3 and thus prevent the release of the said slow-down valve. The result is that the feed rolls 14 and 16 do not resume top speed at the conclusion of the cut-off operation but continue to operate at slow speed until the leading edge of the sheet material opens the switch s11 thereby to de-energize the relay R1. Upon the de-energizing of the relay R1, the stop valve V2 is again operated to stop the feed rolls and then the slotting devices and the scoring bar are again operated to cut the fourth slots N4 and to form the fourth score line E4, as shown in Fig. 6. The relay contacts serve as previously described to then return the slotting and scoring means to their inoperative positions and to cause the rotation of the feed rolls and of the scoring rolls to be resumed at full speed. As previously stated, the feeding of the blank is continued by the scoring rolls and by the belt 18 after the said blank passes beyond the feed rolls.

It should be understood that the present disclosure is for the purpose of illustration only and that this invention includes all modifications and equivalents which fall within the scope of the appended claims.

I claim:

1. In a machine for making a foldable blank for a box, the combination of a support having a longitudinal pathway for a sheet of stock from which a blank is to be made, normally rotating feed rolls for engaging the sheet to feed it longitudinally along the said pathway, a normally operating motor connected with the feed rolls for rotating them, blank forming means adjacent the said pathway, a normally idle motor operatively connected with the blank forming means, an electrical relay, a plurality of switches electrically connected in series with the relay and in parallel with each other, a plurality of means operable in sequence by the leading edge of the sheet as it is moved along the pathway for operating the switches of the said plurality in sequence to thereby successively energize and de-energize the relay, and means controlled by the relay and serving upon each energization and de-energization thereof to stop the first said motor and to cause the second said motor to move the blank forming means into and out of engagement with the sheet and then serving to start the first said motor.

2. In a machine for making a foldable blank for a box, the combination of a support having a longitudinal pathway for a sheet of stock from which a blank is to be made, normally rotating feed rolls for engaging the sheet to feed it longitudinally along the said pathway, a normally operating motor connected with the feed rolls for rotating them, blank forming means adjacent the said pathway, a normally idle motor operatively connected with the blank forming means, an electrical relay, a plurality of pairs of switches electrically connected in series with the relay and in parallel with each other, the switches of each pair being in series with each other and one of them being normally open and the other of them being normally closed, a plurality of means operable in sequence by the leading edge of the sheet as it is moved along the pathway for operating the switches of the said pairs in sequence which means serves with respect to each pair to close the normally open switch to thereby energize the relay and then serves to open the normally closed switch to thereby de-energize the relay, and means controlled by the relay and serving upon each energization and de-energization thereof to stop the first said motor and to cause the second said motor to move the blank forming means into and out of engagement with the sheet and then serving to start the first said motor.

3. In a machine for making a foldabe blank for a box, the combination of a support having a longitudinal pathway for a sheet of stock from which a blank is to be made, normally rotating feed rolls for engaging the sheet to feed it longitudinally along the said pathway, a normally operating motor connected with the feed rolls for rotating them, blank forming means adjacent the said pathway, a normally idle motor operatively connected with the blank forming means, an electrical relay adapted to be energized and de-energized which relay has contacts which upon de-energization are immediately moved and has other contacts which upon de-energization are moved after a predetermined period, a plurality of switches electrically connected in series with the relay and in parallel with each other, a plurality of means operable in sequence by the leading edge of the sheet as it is moved along the pathway for operating the switches of the said plurality in sequence to thereby successively energize and de-energize the relay, means operable upon each de-energization of the relay and controlled by the first said contacts thereof for stopping the first said motor and for causing the second said motor to move the blank forming means into engagement with the sheet, and means operable upon each de-energization of the relay and controlled by the second said contacts thereof for causing the second said motor to move the blank forming means out of engagement with the sheet and for enabling the starting of the first said motor.

4. In a machine for making a foldable blank for a box, the combination of a support having a longitudinal pathway for a sheet of stock from which a blank is to be made, normally rotating feed rolls for engaging the sheet to feed it longitudinally along the said pathway, a normally operating motor connected with the feed rolls for rotating them, blank forming means adjacent the said pathway, a normally idle motor operatively connected with the blank forming means, an electrical relay adapted to be energized and de-energized which relay has contacts which upon de-energization are immediately moved and has other contacts which upon de-energization are moved after a predetermined period, a plurality of switches electrically connected in series with the relay in parallel with each other, a plurality of means operable in sequence by the leading edge of the sheet as it is moved along the pathway for operating the switches of the said plurality in sequence to thereby successively energize and de-energize the relay, means controlled by the relay and operable upon each energization thereof for reducing the speed of the first said motor, means operable upon each de-energization of the relay and controlled by the first said contacts thereof for stopping the first said motor and for causing the second said motor to move the blank forming means into engagement with the sheet, and means operable upon each de-energization of the relay and controlled by the second said contacts thereof for causing the second said motor to move the blank forming means out of engagement with the sheet and for enabling the starting of the first said motor.

5. In a machine having a plurality of instrumentalities for performing successive operations upon a sheet of material as it is moved by feeding means along a pathway through the machine, a control system comprising a time delay relay having contacts which are automatically operable after the elapse of a predetermined timing period, a plurality of switching means arranged to be successively operated by the progress of the sheet material through the machine, the several said switching means being connected with the relay for operating it to repetitively transfer its said contacts as the said switches are successively operated, means controlled by the said contacts of the relay upon each transfer thereof for stopping said feeding means and concomitantly operating one of the instrumentalities, the contacts of the time delay relay returning each operated instrumentality to its retracted position after the elapse of the timing period, and a plurality of interlocking means for restarting the feeding means after the respective instrumentalities have returned to their retracted positions so that as the sheet material progresses through the machine operations are performed thereupon by the said instrumentalities at successive locations determined by the positions of the several switching means.

6. In a machine having instrumentalities for performing successive operations upon a sheet of material as it is moved by feeding means along a pathway through the machine, a control system comprising a time delay relay having a plurality of contacts which are time operated and are transferred upon the elapse of a predetermined timing period after the deenergization of the relay, means for energizing the relay including a plurality of switches disposed along the pathway so as to be tripped sequentially by the progress of the sheet material through the machine, the switches being arranged in pairs and connected to provide parallel electrical circuits for energizing the relay, each pair including a switch having normally open contacts and a switch having normally closed contacts connected in series therewith, the switches of each pair being arranged in longitudinally spaced relationship so that the switch having normally open contacts is operated first by the movement of the sheet material to complete the associated circuit energizing the relay, means controlled by the said contacts of the relay for stopping the feeding means and concomitantly operating the instrumentalities upon the subsequent interruption of the corresponding circuit by the tripping by the sheet material of the associated switch having normally closed contacts, the said time operated contacts of the time delay relay returning the instrumentalities to their retracted positions after the elapse of the timing period, and interlocking means for restarting the feeding means after the instrumentalities have returned to their retracted positions so that as the sheet material progresses through the machine the operations are performed at locations determined by the positioning of the respective pairs of switches.

7. In a machine having instrumentalities for performing successive operations upon a sheet of material as it is moved by feeding means along a pathway through the machine, a control system comprising a time delay relay having a plurality of contacts which are time operated and are transferred upon the elapse of a predetermined timing period after the deenergization of the relay, means for energizing the relay including a plurality of switches disposed along the pathway so as to be tripped sequentially by the progress of the sheet material through the machine, the switches being arranged in pairs and connected to provide parallel electrical circuits for energizing the relay, each pair including a switch having normally open contacts and a switch having normally closed contacts connected in series therewith, the switches of each pair being arranged in longitudinally spaced relationship so that the switch having normally open contacts is operated first by the movement of the sheet material to complete the associated circuit energizing the relay, slow down means operated by the contacts of said relay upon the energization thereof and serving to reduce the rate of operation of the feeding means, means controlled by the contacts of said relay for stopping the feeding means and concomitantly operating the instrumentalities upon the subsequent interruption of the corresponding circuit by the tripping by the sheet material of the associated switch having normally closed contacts, the time operated contacts of the time delay relay returning the instrumentalities to their retracted positions after the elapse of the timing period, and interlocking means for restarting the feeding means after the instrumentalities have returned to their retracted positions so that as the sheet material progresses through the machine the operations are performed at locations determined by the positioning of the respective pairs of switches.

8. In a machine having instrumentalities for performing successive operations upon a sheet of material as it is moved by feeding means along a pathway through the machine, a control system comprising a time delay relay having at least two pairs of contacts, one of which pairs is normally open, the other pair being normally closed, the contacts being time operated so as to return to their normal condition upon the elapse of a predetermined timing period after the deenergization of the relay, means for energizing the relay including a plurality of switches disposed along the pathway so as to be tripped sequentially by the progress of the sheet material through the machine, the switches being arranged in pairs and connected to provide parallel electrical circuits for energizing the relay, each pair including a switch having normally open contacts and a switch having normally closed contacts connected in series therewith, the switches of each pair being arranged in spaced relationship so that the switch having normally open contacts is operated first by the movement of the sheet material to complete the associated circuit energizing the relay, control means for stopping the feeding means energized by said normally closed relay contacts, further control means for operating said instrumentalities energized by said normally open relay contacts, the time opening contacts of the time delay relay returning the instrumentalities to their retracted positions after the elapse of the timing period and interlocking means for restarting the feeding means after the instrumentalities have returned to their retracted positions so that as the sheet material progresses through the machine the operations are performed at locations determined by the positioning of the respective pairs of switches.

9. In a machine having instrumentalities for performing successive operations upon a sheet of material as it is moved by feeding means along a pathway through the machine, a control system comprising a time delay relay having two pair of normally open contacts and two pair of normally closed contacts which are transferred upon energization of the relay, one pair of normally open contacts and one pair of normally closed contacts being time opening and time closing respectively so as to return to their normal condition upon the elapse of a predetermined timing period after the deenergization of the relay, control means including an interlocking switch operated by said instrumentalities for starting and stopping the feeding means, a control switch disposed in said pathway to be tripped by the passing of the sheet material through the machine, said control switch being connected in series with the interlocking switch to energize said control means alternatively through said normally open contacts or said time closing contacts of said relay thereby to operate said feeding means except for a period from the deenergization of the time delay relay until the operation of the interlocking switch during which period the feeding means are stopped to arrest the movement of the sheet material, means for energizing the relay including a plurality of switches disposed along the pathway behind the control switch so as to be tripped sequentially by the progress of the sheet material through the machine, the switches being arranged in pairs and connected to provide parallel electrical circuits for energizing the relay, each pair including a switch having normally open contacts and a switch having normally closed contacts connected in series therewith, the switches of each pair being arranged in spaced relationship so that the switch having normally open contacts is operated first by the movement of the sheet material to complete the associated circuit energizing the relay, and further control means for operating the instrumentalities, said normally closed contacts and said time opening contacts of the time delay relay being connected in series to energize the further control means so that the operation of the instrumentalities initiated by each pair of switches takes place during the period when the movement of the sheet material is arrested, the time closing contacts of the time delay relay subsequently restarting the feeding means after the completion of the operation of the instrumentalities so that as the sheet material progresses through the machine successive operations are performed at locations determined by the positioning of the respective pairs of switches.

10. A control system according to claim 9, including means for slowing down said feeding means, and a slow down relay having contacts connected to energize said slow down means, said relay being energized by the time opening contacts of said time delay relay so that the velocity of the sheet material through the machine is reduced each time the sheet material trips the normally open switch of each respective pairs of switches.

11. In a machine having slotting means and cutoff means for performing successive operations upon a sheet of material as it is moved by feeding means along a pathway through the machine, a control system comprising first and second time delay relays each having at least two pairs of contacts, one of which pairs is normally open and the other of which pair is normally closed, the contacts being time operated so as to return to their normal condition upon the elapse of a predetermined timing period after the deenergization of the respective relay, means for energizing the relays including a plurality of switches disposed along the pathway so as to be tripped sequentially by the progress of the sheet material through the machine, the switches being arranged in pairs including a switch having normally open contacts and a switch having normally closed contacts connected in series therewith, the last pair of switches completing an electrical circuit energizing the second said relay and the remaining pairs of switches being connected to provide parallel electric circuits for energizing the said first relay, the switches of each pair being disposed in longitudinally spaced relationship so that the switch having normally open contacts is operated first by the movement of the sheet material to complete the associated circuit energizing the connected relay, a first control means for operating the slotting means, a second control means for operating the cut-off means, a third control means for starting and stopping the feeding means including interlocking switches operated respectively by said slotting means and cutoff means, said normally closed contacts of both of the said relays being connected in series with both of the said interlocking switches to energize said third control means, means energized by the normally open contacts of the first relay for operating the said first control means, and means energized by the normally open contacts of the second relay for operating the said second control means, the time closing contacts of the respective time delay relays returning the slotting and cutoff means to their retracted positions after the elapse of timing periods of the relays and the respective interlocking switches restarting the feeding means upon the return of the slotting and cutoff means to their retracted positions so that as the sheet material progresses through the machine it is slotted and cutoff at locations determined by the positioning of the respective pairs of switches.

12. In a machine for making a foldable blank for a box, the combination of a support having a longitudinal pathway for a sheet of stock from which the blank is to be made, normally moving means for engaging the sheet to feed it longitudinally along the said pathway, transverse slotting and scoring means adjacent the said pathway, cut-off means adjacent the pathway and spaced in the trailing direction from the slotting and scoring means, at least three longitudinally spaced control means positioned for actuation in sequence by the leading edge of the sheet as it is fed longitudinally, means dependent upon the actuation of one control means for interrupting the movement of the feeding means and for moving the slotting and scoring means into and out of engagement with the sheet while feeding is interrupted so as to form transverse slots and a transverse score line, means dependent upon the actuation of the next actuated control means for again interrupting the movement of the feeding means and for moving the cut-off means into and out of engagement with the sheet while feeding is interrupted so as to effect cut-off or severing at the trailing edge of the blank, and means dependent upon the actuation of the next actuated control means for again interrupting the movement of the feeding means and for moving the slotting and scoring means into and out of engagement with the severed blank while feeding is interrupted so as to form additional slots and an additional score line spaced in the trailing position from the first said slots and score line and spaced in the leading direction from the said trailing edge.

13. In a machine for making a foldable blank for a box, the combination of a support having a longitudinal pathway for a sheet of stock from which a blank is to be made, normally rotating feed rolls for engaging the sheet to feed it longitudinally along the said pathway, a normally operating motor connected with the feed rolls for rotating them, transverse slotting and scoring means adjacent the said pathway, a normally idle motor operatively connected with the slotting and scoring means, cut-off means adjacent the said pathway and spaced in the trailing direction from the slotting and scoring means, a second normally idle motor operatively connected with the cut-off means, first and second electrical relays, a plurality of switches electrically connected in series with the first relay and in parallel with each other, a plurality of means operable in sequence by the leading edge of the sheet as it is moved along the pathway for operating the switches of the said plurality in sequence to thereby successively energize and de-energize the said first relay, means controlled by the said first relay and serving upon each energization and deenergization thereof to stop the first said motor and to cause the first normally idle motor to move the slotting and scoring means into and out of engagement with the sheet and then serving to start the first said motor, a switch connected in series with the second relay, means operable by the leading edge of the sheet for operating the last said switch to energize and de-energize the said second relay which means is spaced in the leading direction from the plurality of means for operating the first said switches, means controlled by the said second relay and serving upon energization and de-energization thereof to stop the first said motor and to cause the second normally idle motor to move the cut-off means into and out of engagement with the sheet to effect cut-off or severing at the trailing edge of the blank, switches connected in series with the said first relay and in parallel with the said plurality of switches, and means operable by the leading edge of the sheet for operating the last said switches to again energize and de-energize the said first relay which relay then acts through the said means controlled thereby to again stop the first said motor and to cause the first normally idle motor to again move the slotting and scoring means into and out of engagement with the sheet and to again start the first said motor.

14. In a machine having slotting means and cutoff means for performing successive operations upon a sheet of material as it is moved by feeding means along a pathway through the machine, a control system comprising first and second time delay relays each having two pair of normally open contacts and two pair of normally closed contacts which are transferred upon energization of the respective relays, one pair of normally open contacts and one pair of normally closed contacts of each relay being time opening and time closing respectively so as to return to their normal condition upon the elapse of a predetermined timing period after the deenergization of the corresponding relay, means for stopping and starting the feeding means including interlocking switches operated respectively by said slotting means, and cutoff means a control switch disposed in said pathway to be tripped by the passing of the sheet material through the machine, said control switch being connected in series with the interlocking switches alternatively through the normally open contacts or said time closing contacts of said relays thereby to operate said feeding means except for a period from the de-energization of either of the time delay relays until the operation of a respective interlocking switch during which period the feeding means are stopped to arrest the movement of the sheet material, a first control means for operating the slotting means, a second control means for operating the cut-off means, means for energizing the relays including a plurality of switches disposed along the pathway behind said control switch so as to be tripped sequentially by the progress of the sheet material through the machine, the switches being arranged in pairs including a switch having normally open contacts and a switch having normally closed contacts connected in series therewith, the last pair of switches completing an electric circuit energizing the said second relay and the remaining pairs of switches being connected to provide parallel electric circuits for energizing the said first relay, the switches of each pair being arranged in longitudinally spaced relationship so that the switch having normally open contacts is operated first by the movement of the sheet material to complete the associated circuit energizing the connected relay, further control means for operating the cutoff means, said normally closed contacts and said time opening contacts of the said first relay being connected in series to energize the further control means so that the cutoff operation initiated by the last pair of switches takes place during one of the periods when the movement of the sheet material is arrested, and separate control means for operating the slotting means, said normally closed contacts and said time opening contacts of the said second relay being connected in series to energize the further control means so that the slotting operation initiated by all except the last pair of switches takes place during one of the periods when the movement of the sheet material is arrested, the time closing contacts of the respective time delay relays returning the slotting means and cutoff means to their retracted positions after the elapse of the timing periods of the relays, the respective interlocking switches restarting the feeding means upon the return of the slotting means and cutoff means to their retracted positions so that as the sheet material progresses through the machine it is cutoff and slotted at locations determined by the positioning of the respective pairs of switches.

15. A control system according to claim 14 including means for slowing down said feeding means, and two slow down relays respectively having pairs of contacts connected in parallel to energize the slow down means, said slow down relays being operated respectively by the time opening contacts of the two time delay relays so that the velocity of the sheet material through the machine is reduced each time the sheet material trips the normally open switch of each respective pair of switches.

16. A control system according to claim 14 including an additional switch having normally closed contacts disposed in the path of said sheet material behind the last pair of switches, the normally closed switch of said last pair also being provided with normally open contacts which are connected in series with the normally open switch of said last pair and said additional switch to energize the second time delay relay controlling said slotting means whereby additional slots are cut in the sheet material subsequent to the cutoff operation.

References Cited in the file of this patent

UNITED STATES PATENTS

| Number | Name | Date |
|--------|------|------|
| 1,067,253 | Inman | July 15, 1913 |
| 1,286,714 | Moore | Dec. 3, 1918 |
| 1,435,979 | Reed | Nov. 21, 1922 |
| 2,379,682 | Colucci | July 3, 1945 |